(12) United States Patent
Ku

(10) Patent No.: US 10,176,497 B2
(45) Date of Patent: Jan. 8, 2019

(54) INTERNET ADVERTISEMENT METHOD AND SYSTEM FOR DISTRIBUTING COMMERCIAL SAMPLE THROUGH MEMBERSHIP-BASED OFF-LINE SHOP BASED ON AUTHENTICATION KEY ISSUED TO TARGET CUSTOMER ON-LINE

(71) Applicant: eBay Korea Co., Ltd., Seoul (KR)

(72) Inventor: Young Bae Ku, Seoul (KR)

(73) Assignee: eBay Korea Co., Ltd, Seoul (KR)

(*) Notice: Subject to any disclaimer, the term of this patent is extended or adjusted under 35 U.S.C. 154(b) by 271 days.

(21) Appl. No.: 14/160,291

(22) Filed: Jan. 21, 2014

(65) Prior Publication Data
US 2014/0136326 A1 May 15, 2014

Related U.S. Application Data

(63) Continuation of application No. 12/383,439, filed on Mar. 24, 2009, now Pat. No. 8,639,576.

(30) Foreign Application Priority Data

Mar. 27, 2008 (KR) .................. 10-2008-0028371

(51) Int. Cl.
*G06Q 30/02* (2012.01)
*G06Q 20/10* (2012.01)
(Continued)

(52) U.S. Cl.
CPC ....... *G06Q 30/0257* (2013.01); *G06Q 20/102* (2013.01); *G06Q 20/20* (2013.01);
(Continued)

(58) Field of Classification Search
CPC .... G06Q 30/00; G06Q 30/02; G06Q 30/0241; G06Q 30/0251; G06Q 30/0257
(Continued)

(56) References Cited

U.S. PATENT DOCUMENTS

| 8,639,576 B2 | 1/2014 | Ku et al. |
| 2002/0046085 A1 | 4/2002 | Rochon et al. |

(Continued)

FOREIGN PATENT DOCUMENTS

| JP | 2003132265 A | 5/2003 |
| JP | 2003208535 A | 7/2003 |

(Continued)

OTHER PUBLICATIONS

"U.S. Appl. No. 12/383,439, Examiner Interview Summary dated Jun. 20, 2012", 3 pgs.

(Continued)

*Primary Examiner* — Marilyn G Macasiano
(74) *Attorney, Agent, or Firm* — Shook, Hardy & Bacon, L.L.P.

(57) ABSTRACT

An Internet advertisement method and system that issues an authentication key for enabling selected target customers to receive a commercial sample at a membership-based offline store by performing an advertisement in the form of a banner on a web page of an online market, such as an Internet shopping mall, such that an advertiser can conveniently satisfy needs of customers desiring to purchase goods after receiving the sample without delivering the sample, a targeting goods advertisement can be effectively performed, membership-based offline stores can be publicized, and increasing visits from customers can lead to an increase in sales. The Internet advertisement method includes providing an advertisement including information on providing a sample, and generating an authentication key for enabling a customer terminal selecting the advertisement and requesting a sample of advertised goods to receive the sample at an offline store.

19 Claims, 8 Drawing Sheets

(51) Int. Cl.
*G06Q 20/20* (2012.01)
*G06Q 30/06* (2012.01)

(52) U.S. Cl.
CPC ........... *G06Q 20/206* (2013.01); *G06Q 30/02* (2013.01); *G06Q 30/0239* (2013.01); *G06Q 30/0601* (2013.01); *G06Q 30/0603* (2013.01)

(58) Field of Classification Search
USPC .......................................... 705/14.16, 14.19
See application file for complete search history.

(56) References Cited

U.S. PATENT DOCUMENTS

| | | | |
|---|---|---|---|
| 2002/0046174 A1 | 4/2002 | Sugimori | |
| 2007/0288312 A1* | 12/2007 | Wang | G06Q 30/0214 705/14.16 |
| 2008/0208673 A1* | 8/2008 | Mebruer | G06Q 30/02 705/14.19 |
| 2009/0248520 A1 | 10/2009 | Ku | |
| 2010/0030631 A1 | 2/2010 | Watanabe | |
| 2010/0131096 A1 | 5/2010 | Koyano | |

FOREIGN PATENT DOCUMENTS

| | | |
|---|---|---|
| JP | 2004503882 A | 2/2004 |
| JP | 2006107413 A | 4/2006 |
| KR | 20010067771 A | 7/2001 |
| KR | 20020007251 A | 1/2002 |
| WO | WO-0197131 A2 | 12/2001 |

OTHER PUBLICATIONS

"U.S. Appl. No. 12/383,439, Final Office Action dated Feb. 29, 2012", 27 pgs.

"U.S. Appl. No. 12/383,439, Non Final Office Action dated Sep. 15, 2011", 26 pgs.

"U.S. Appl. No. 12/383,439, Notice of Allowance dated Sep. 25, 2013", 9 pgs.

"U.S. Appl. No. 12/383,439, Response filed Jun. 28, 2012 to Final Office Action dated Feb. 29, 2012", 14 pgs.

"U.S. Appl. No. 12/383,439, Response filed Dec. 15, 2011 to Non Final Office Action dated Sep. 15, 2011", 18 pgs.

* cited by examiner

FIG. 5

☐ HONG GIL-DONG

☐ SAMPLE NAME: XX COMPANY ☐ ☐ COSMETIC SAMPLE

☐ FRANCHISE SELECTION

GANGNAM STATION ☑  SAMSUNG STATION ☐
FRANCHISE          FRANCHISE
SADANG STATION ☐   JAMSIL STATION ☐
FRANCHISE          FRANCHISE
JONGGAK STATION ☐  SINDANG STATION ☐
FRANCHISE          FRANCHISE

DO YOU WANT TO
RECEIVE A SAMPLE?

FIG. 6

☐ AUTHENTICATION KEY ISSUE LIST

| CUSTOMER NAME | CONTACT INFORMATION | ADDRESS | ISSUED AUTHENTICATION KEY | AUTHENTICATION KEY VERIFICATION | SAMPLE PROVISION |
|---|---|---|---|---|---|
| 1. HONG GIL-DONG | XX-XXX-XXXX | XXX ... | S1F3???? | VERIFY | CONFIRM |
| 2. ... | ... | ... | ... | ... | ... |

INTERNET ADVERTISEMENT METHOD AND SYSTEM FOR DISTRIBUTING COMMERCIAL SAMPLE THROUGH MEMBERSHIP-BASED OFF-LINE SHOP BASED ON AUTHENTICATION KEY ISSUED TO TARGET CUSTOMER ON-LINE

CROSS-REFERENCE TO RELATED APPLICATIONS

This application is a continuation of and claims the benefit of priority under to U.S. patent application Ser. No. 12/383,439, filed on Mar. 24, 2009, which claims priority to and the benefit of Korean Patent Application No. 10-2008-0028371, filed on Mar. 27, 2008, the disclosure of which are incorporated herein by reference in their entirety.

FIELD OF THE INVENTION

The present invention relates to an Internet advertisement method and system, and more particularly, to an Internet advertisement method and system that issue an authentication key for enabling selected target customers to receive a commercial sample at a membership-based offline store by performing an advertisement in the form of a banner on a web page of an online market, such as an Internet shopping mall, such that an advertiser can conveniently satisfy needs of customers desiring to purchase goods after receiving the sample without directly delivering the sample, a targeting advertisement can be effectively performed, publicity of membership-based offline stores can be given, and increasing visits from customers can lead to an increase in sales.

BACKGROUND OF THE INVENTION

On numerous Internet web sites such as Internet shopping malls, there are advertisements in the form of banners with which advertisers publicize goods. Advertisements are intended to promote customers to purchase goods after reading contents of the advertisements. However, most of the advertisements do not sufficiently explain the contents of the advertisement and many advertisements exaggerate the contents. Accordingly, customers may doubt whether the real goods are likely to differ from the content of the advertisements and may be hesitant to purchase the goods. Thus, most customers ignore the advertisements.

For example, a buyer purchases goods using a method as shown in FIG. 1 at an online market. The buyer reads content of an advertisement related to desired goods while looking around an online market such as an Internet shopping mall in order to purchase the goods (S110). The buyer may encounter the advertisement in another website or any frequently used online market. Where the content of the advertisement stimulates the buyer to purchase the goods, the buyer searches for a list of goods for sale of the advertiser at a subscribed online market (S120), selects goods of interest from the list (S130), pays a price of the goods and requests the purchase (S140), and receives the goods through delivery (S150, S160).

However, in a typical process in which a buyer reads an advertisement and purchases goods, the buyer must be able to believe the content of the advertisement. The buyer receiving the goods may return the received goods and request a refund if they are different from the advertised goods. Accordingly, there is a need for an Internet advertisement method and system in many web sites including online markets that enable buyers to easily receive a desired sample from an advertiser and to purchase the goods corresponding to the sample for effective advertisements on the web site.

SUMMARY OF THE INVENTION

The present invention is directed to an Internet advertisement method and system that are capable of performing an advertisement in the form of a banner on a web page of an online market, such as an Internet shopping mall, for enabling selected target customers to receive a commercial sample at a membership-based offline store, such that a targeting advertisement of goods can be effectively performed, membership-based offline stores can be publicized, and increasing visits from customers can lead to an increase in sales.

The present invention is also directed to an Internet advertisement method and system that enable a target customer to easily receive a commercial sample, using an authentication key or membership card issued through an advertisement on a web page, at a desired membership-based offline store without requesting an advertiser to directly deliver the sample, thereby conveniently satisfying needs of customers desiring to purchase goods after receiving the commercial sample.

According to an aspect of the present invention, there is provided an Internet advertisement method including: providing an advertisement including information on providing a sample; and generating an authentication key for enabling a customer terminal selecting the advertisement and requesting a sample of advertised goods to receive the sample at an offline store.

The method may further include, prior to generating the authentication key, providing a sample application form to the customer terminal; and generating the authentication key in response to a notification that the sample application form has been completed from the customer terminal.

Generating the authentication key may include receiving log-in information of a customer from a customer terminal and determining whether the customer is a target customer; and generating the authentication key corresponding to the customer terminal to the target customer according to the determination results.

The method may further include, prior to providing an advertisement, registering a target information profile in a database, the target information profile indicating target customers selected and designated in advance by an advertiser. Here, determining whether the customer is a target customer may include comparing the target information profile with membership information based on the log-in information from the customer terminal to make the determination.

The target information profile may include at least one of sex, age, and terminal access region of customers designated as objects to which the sample is to be provided.

Registering the target information profile may include: registering information on at least one offline store in the database. The method may further comprise, prior to generating an authentication key, providing the offline store information in a sample application form to the customer terminal and selecting an offline store where the customer desires to receive the sample of the advertised goods when the sample application form is being filled out using the customer terminal.

The method may further include, after generating an authentication key, notifying the franchise terminal of whether the authentication is successfully performed, in response to a request for verification of the authentication key from the franchise terminal.

The franchise terminal may input the authentication key issued to the customer terminal and transmit the request for verification of the authentication key to a server using at least one medium from among a virtual area network (VAN), an open market seller management system, a point of sale (POS), an automatic replying system (ARS), a cellular phone, and a barcode reader, or may input membership information and transmit a request for verification of an authentication key managed by the server to the server using the at least one medium.

The method may further include, after notifying, receiving a notification that provision of the sample has been completed including details of sample provision to the customer visiting the offline store, from the franchise terminal.

The method may further include, after receiving the notification of sample provision completion, settling advertising expenditure according to a commission policy. The commission policy may be determined based on an issue number of the authentication key generated by the online market or verified in response to a request for verification from the franchise or based on the number of samples provided by the offline store.

The Internet advertisement method may be utilized at an online market for brokering goods registration by sellers, goods purchase by buyers, and delivery of paid goods.

According to another aspect of the present invention, there is provided an Internet advertisement system including: a target advertisement manager for providing a target advertisement including information on providing a sample; and an authentication key generator for generating an authentication key for enabling a customer terminal selecting the target advertisement and requesting a sample of advertised goods to receive the sample at an offline store.

The system may further include: a database for managing at least one of a target information profile for selecting and designating target customers in advance by an advertiser, information on at least one offline store, and a sample application form for requesting the sample. Here, the target advertisement manager may transmit the offline store information in the sample application form provided to the customer terminal. When a notification that the sample application form has been completed indicating a selected franchise where the customer desires to receive the sample of advertised goods is received from the customer terminal, the authentication key generator may generate the authentication key.

The authentication key generator may request the customer terminal to log in upon receipt of the request for the sample, and compare membership information based on log-in information from the customer terminal with the target information profile, and when it is determined that the customer is a target customer, the target advertisement manager may provide the sample application form to the customer terminal.

The Internet advertisement system may further include: a sample receipt authenticator for notifying the franchise terminal of whether the authentication is successfully performed in response to a request for verification of the authentication key from the franchise terminal.

The Internet advertisement system may further include: an advertising expenditure settling unit for settling advertising expenditure according to a commission policy, when the authentication is successfully performed and a notification that provision of the sample has been completed including details of sample provision to the customer visiting the offline store is received from the franchise terminal.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 5 illustrates an example of a sample application form;

FIG. 6 illustrates an example of an authentication key issue list screen of an advertiser terminal or a franchise terminal;

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
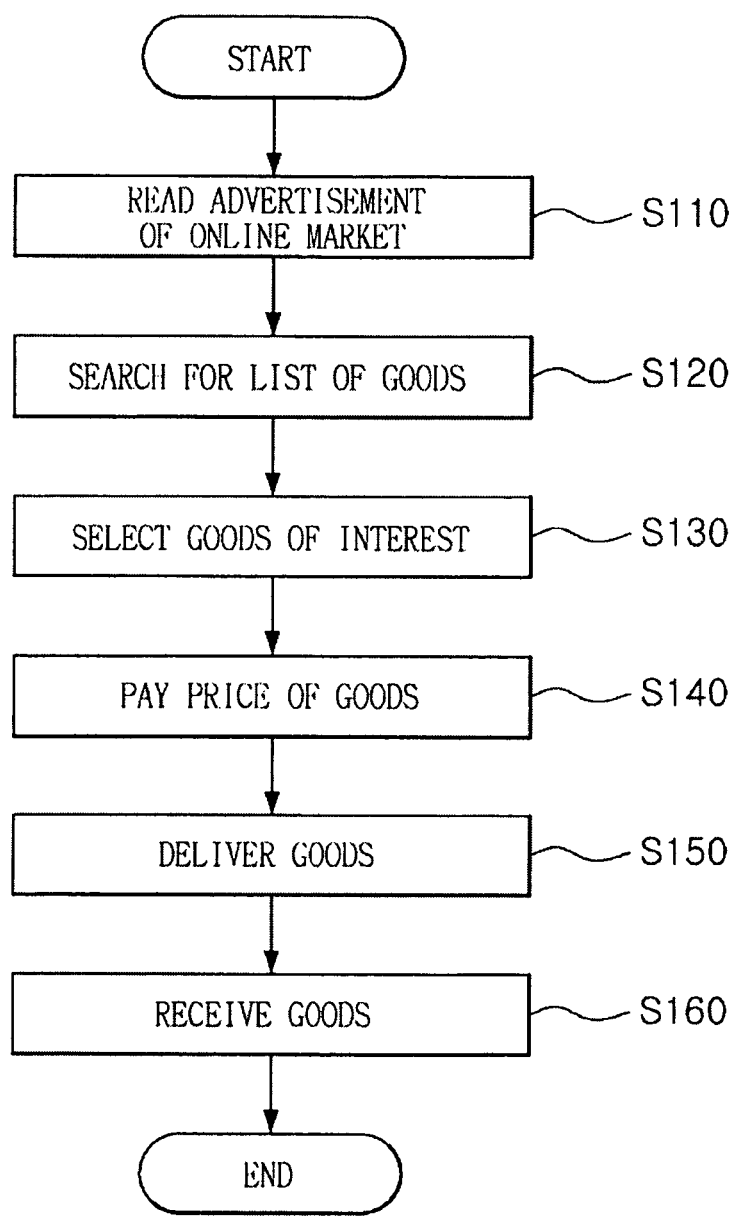
FIG. 1 is a flowchart illustrating a conventional method for purchasing goods through an advertisement at an online market.
Figure 2:
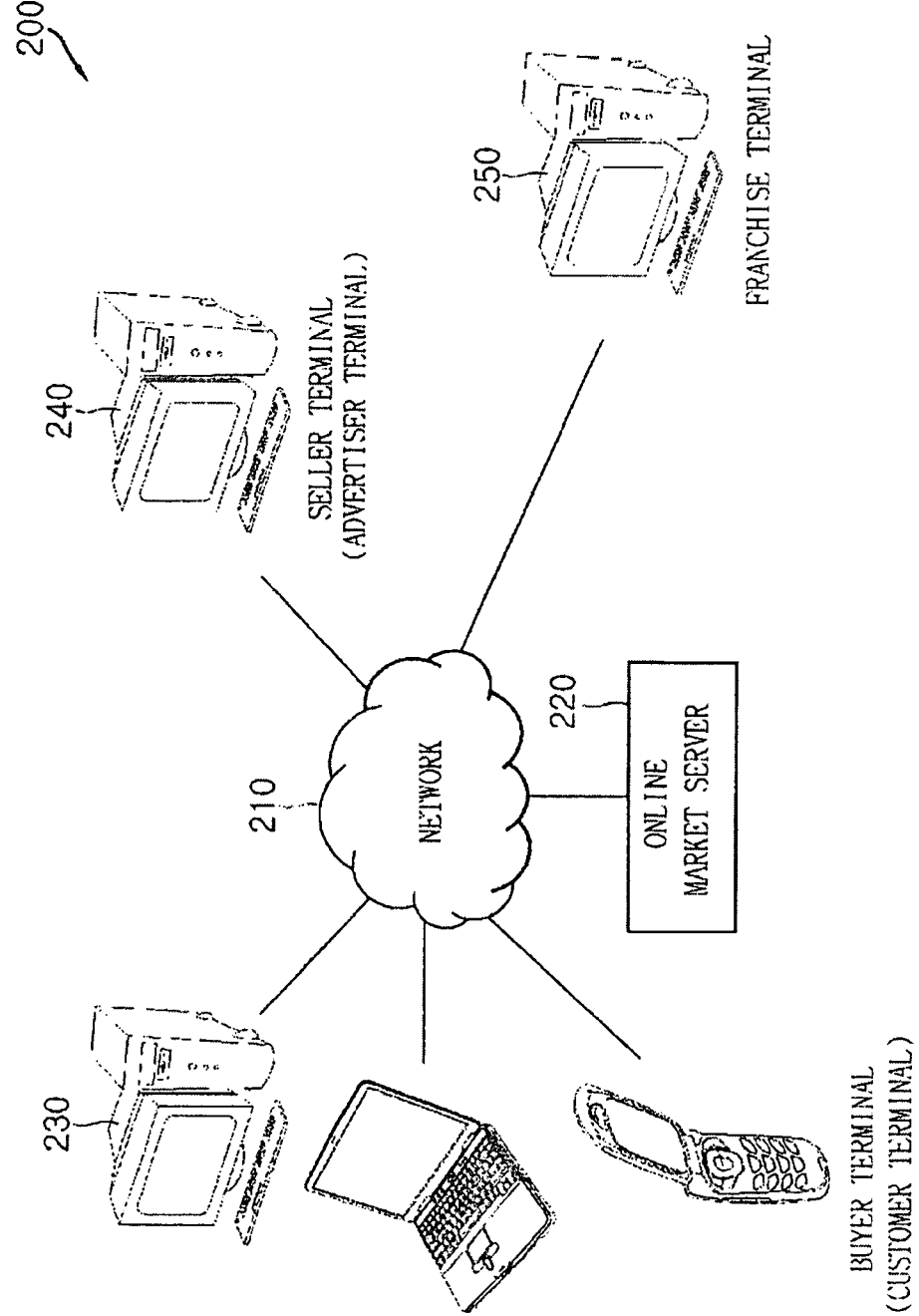
FIG. 2 illustrates an Internet advertisement system applied to an online market according to an exemplary embodiment of the present invention.

FIG. 2 illustrates an Internet advertisement system 200 applied to an online market according to an exemplary embodiment of the present invention. Referring to FIG. 2, the Internet advertisement system 200 according to an exemplary embodiment of the present invention may include a network 210, an online market server 220, a buyer terminal (i.e., customer terminal) 230, a seller terminal (i.e., advertiser terminal) 240, and a franchise terminal 250.

Here, the network 210 may be wired or wireless Internet. Alternatively, the network 210 may be a core network integrated with a wired public network, a wireless mobile communication network, or a portable Internet. The online market server 220 manages an online shopping mall over the network 210 and brokers goods transaction between a seller and a buyer. The online market server 220 manages a web page required for managing a shopping mall, through which the online market server 220 receives a variety of the seller's goods to be registered from the seller terminal 240 over the network 210 and provides the registered goods to the buyer terminal 230 over the network 210 so that the buyer can purchase desired ones of the goods. The online market server 220 may perform payment on goods selected for purchase by the buyer from a list of the goods, notify the seller of a guide to the paid goods for delivery of the goods to the buyer, provide position tracking or tracking result inquiry service for the goods being delivered, and manage necessary web pages.

In the present invention, particularly, the online market server 220 may perform an advertisement in the form of a banner on the web page to provide a commercial sample to selected customers at a membership-based offline store, while managing the shopping mall. Accordingly, a targeting advertisement for the goods of an advertiser (seller) can be effectively performed, the membership-based offline store can be publicized, and increasing visits from customers can lead to increase in sales.

Specifically, the online market server 220 in the online market system 200 according to an exemplary embodiment of the present invention may provide a target advertisement including information on providing a sample on the web page, and generate an authentication key (e.g., Arabic numerals, a discernible text, or barcode information) for enabling the customer terminal 230, which selects the target advertisement and requests the sample of the advertised goods, to receive the sample at the offline store. As described in detail below, the target advertisement is registered by an advertiser (i.e., seller) to publicize the goods. The advertiser may register a target information profile for selecting and designating target customers in advance, and offline store information, along with the content of the advertisement, in the online market server 220, using the advertiser terminal 240. The authentication key may be issued to target customers corresponding to sex, age, and access regions defined by the advertiser in the target information profile. When the authentication key is verified by through the franchise terminal 250, the sample may be provided to the customers, for example, by a franchise clerk.

The buyer terminal 230, the seller terminal 240 and the franchise terminal 250 are generally computers, such as desktop personal computers (PCs), notebook PCs, and the like, but are not limited thereto and may be any wired or wireless communication devices that can access the online market server 220 over the network 210 and use bidirectional goods transaction brokerage service. For example, the buyer terminal 230, the seller terminal 240 and the franchise terminal 250 may be mobile terminals, such as cellular phones, personal communications services (PCS) phones, or synchronous/asynchronous International Mobile Telecommunication (IMT)-2000 terminals that communicate over wireless or portable Internet. Alternatively, they may be any wired and wireless home appliances/communication devices having a user interface for accessing the online market server 220, such as palm PCs, personal digital assistants (PDAs), smart phones, wireless application protocol (WAP) phones, mobile game machines (e.g., mobile play-stations), etc.

In particular, the franchise terminal 250 may use a virtual area network (VAN), an open market seller management system, a point of sale (POS), an automatic replying system (ARS), and a barcode reader connected via the Internet, a public network, or any dedicated line, as well as the wireless terminal such as the cellular phone, to verify the authentication key. When the authentication key is input or when membership information is read from a membership card and transmitted to the online market server 220 using the VAN, the open market seller management system, the POS, the ARS, or the barcode reader, the online market server 220 may compare it with an authentication key managed in a database to verify the authentication key. Since the VAN, the POS, the ARS, and the barcode reader are well known in the art, detailed descriptions thereof will be omitted. The open market seller management system is managed by the online market server 220 so that seller-related information, such as membership information, goods/advertisement/target information profile registration, sale information, payment information, delivery information, advertisement information, settling information, can be processed in an open market online.

Figure 3:
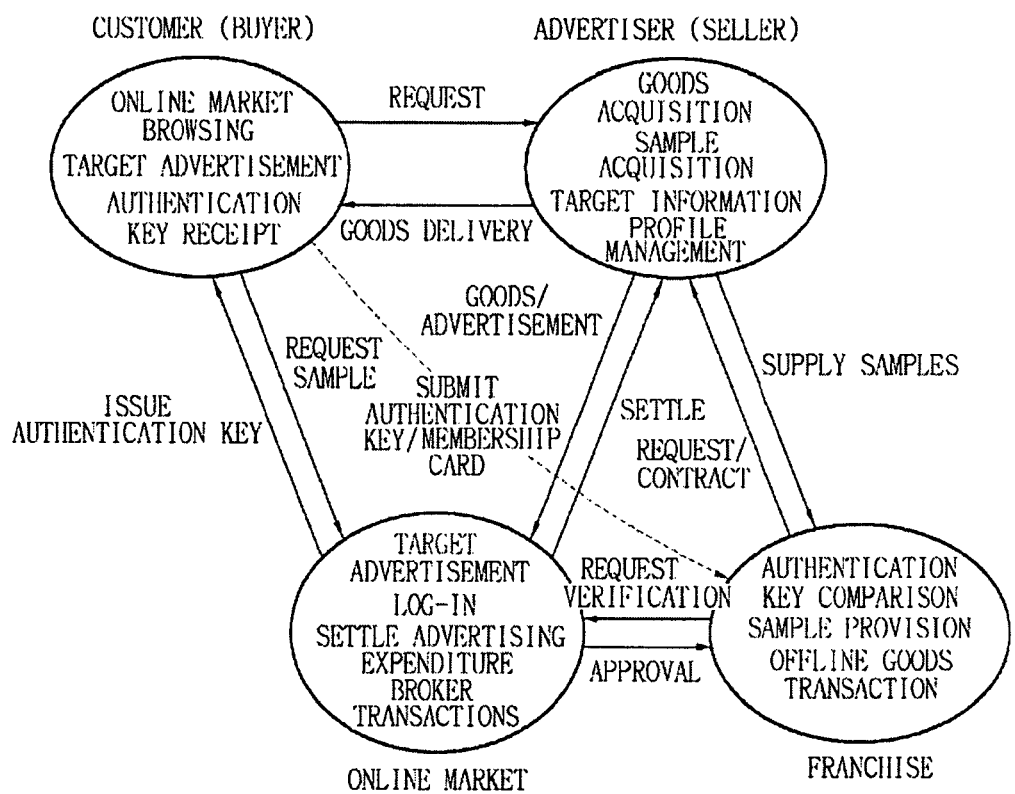
FIG. 3 illustrates relationships among a customer (buyer), an advertiser (seller), an online market, and a franchise according to an exemplary embodiment of the present invention.

FIG. 3 illustrates relationships among a customer (buyer), an advertiser (seller), an online market, and a franchise according to an exemplary embodiment of the present invention. Referring to FIG. 3, when the seller registers goods to advertise or sell the goods in an online market or registers the content of the advertisement (e.g., images, videos, and the like), a target information profile (e.g., sex, age, and a terminal access region of customers designated as objects to which a sample is to be provided), and franchise information in the online market, the online market introduces the registered goods to a shopping mall, brokers transactions with the buyer, provides target advertisements to a web page, and issues an authentication key (e.g., Arabic numerals, a discernible text, or barcode information) for enabling target customers to receive the sample of the advertised goods at an offline store, such as a franchise, through log-in, when the customers recognize and select the target advertisement to request the sample on the site. Accordingly, the buyer submits the received authentication key or membership card to the franchise and requests the sample. The offline franchise contracted to sell goods in various ways in a convenience store, a supermarket, a stationery store, a post office, a department store, a cosmetics store, etc. may provide the sample to the customer when the authentication key is verified using a VAN, a POS, an open market seller management system, an ARS, a barcode reader, or the like. In this case, after the franchise provides the sample, the online market settles a predetermined commission for the advertiser according to a commission policy. The commission may be determined based on an issue number of the authentication key generated by the online market or verified in response to a request for verification from the franchise or based on the number of samples provided by the franchise.

As described above, according to the present invention, target customers can easily receive commercial samples (e.g., agricultural products, cosmetics, groceries, side dishes, home appliances, or any of industrial products, agricultural goods, and services of which the samples may be required by customers) at a desired membership-based offline store using the authentication key issued through the advertisement on the web page, without requesting an advertiser to directly deliver the samples. After receiving the commercial sample, the customer may purchase the goods at either the online market or the offline store when their quality is satisfactory. This can conveniently satisfy needs of customers interested in the goods.

Figure 4:
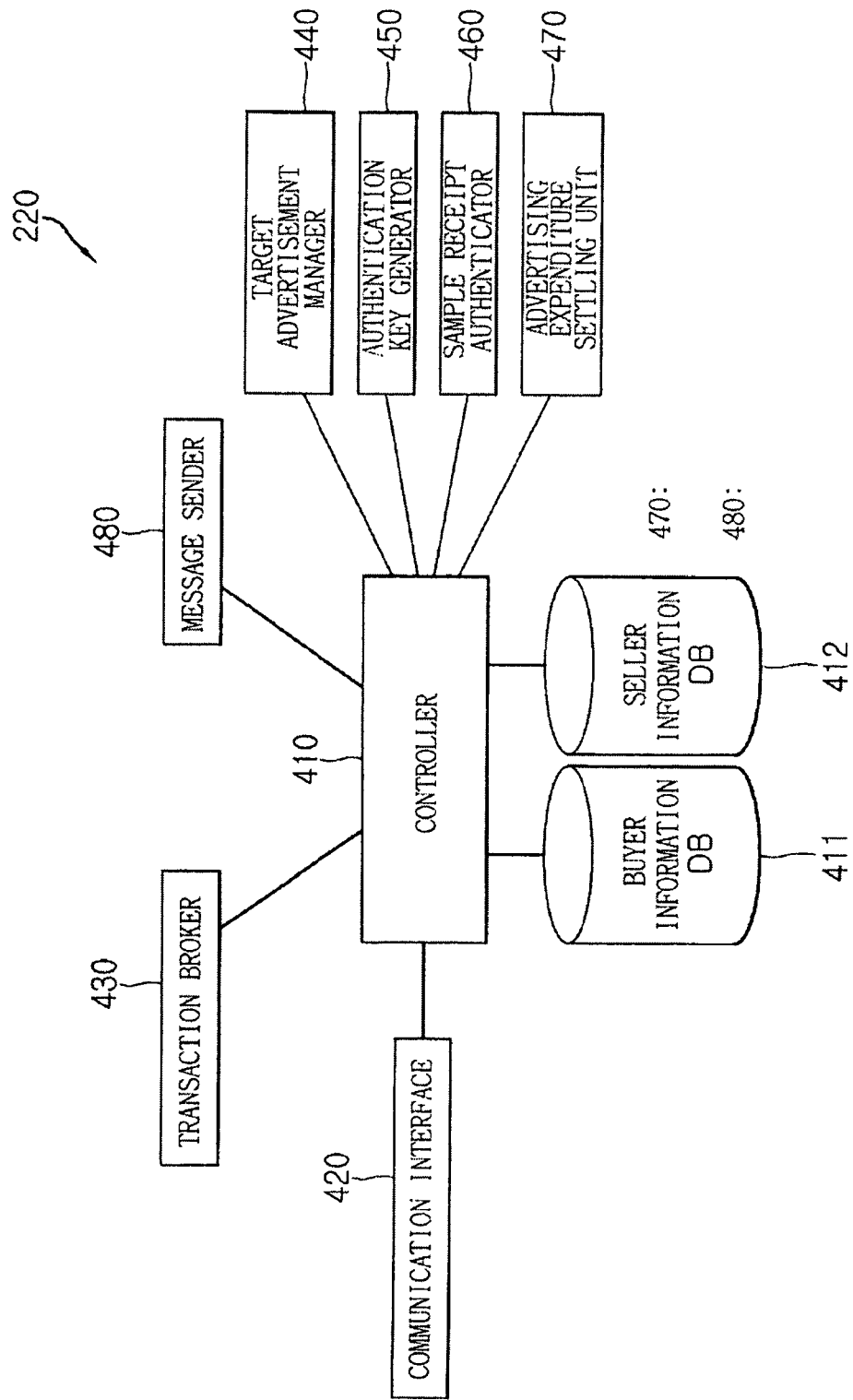
FIG. 4 is a block diagram of an online market server as a web server according to an exemplary embodiment of the present invention.

FIG. 4 is a block diagram of the online market server 220 that is a web server for managing a target advertisement according to an exemplary embodiment of the present invention.

Referring to FIG. 4, the online market server 220 according to an exemplary embodiment of the present invention includes a controller 410, a buyer information DB 411, a seller information DB 412, a communication interface 420, a transaction broker 430, a target advertisement manager 440, an authentication key generator 450, a sample receipt authenticator 460, an advertising expenditure settling unit 470, and a message sender 480.

The controller 410 is a processor for controlling the above components of the online market server 220, basically including registration of goods by sellers, purchase of goods by buyers, and delivery of paid goods for shopping mall management. In particular, the controller 410 controls to provide the above target advertisement including information on providing a sample to the web page and to generate the authentication key for enabling the customer terminal 230 selecting the target advertisement and requesting the sample of the advertised goods to receive the sample in the franchise.

The seller terminal (i.e., advertiser terminal) 240 may access the online market server 220 over the network 210, use goods transaction brokerage service provided by the online market server 220 through wired or wireless communication using the communication interface 420, and use the target advertisement service according to the present invention. The seller may subscribe as a service use customer of the online market server 220 using the seller terminal 240. Seller membership information, e.g., a seller ID, a password, contact information, prices of goods, brands of goods, and features of goods registered by the subscribed seller may be stored and managed in the seller information DB 412. Further, the content of the advertisement (e.g., images, videos, and the like), a target information profile (e.g., sex, age, and terminal access region of customers designated as objects to which the sample is to be provided), and franchise information that the seller registers to use the target advertisement service may be stored and managed in the seller information DB 412.

The buyer terminal (i.e., customer terminal) 230 may access the online market server 220 over the network 210 and may use goods transaction brokerage service provided by the online market server 220 through the wired or wireless communication using the communication interface 420. The buyer may subscribe as a service use customer of the online market server 220 using the buyer terminal 230. Purchaser membership information, e.g., a buyer ID and a password for log-in, a residence registration number, contact information, an address, cart information, bid goods information, successfully bid goods information, bargaining goods information, information on paid goods, delivery information, information on purchase determination (receipt confirmation), and the like that the subscribed buyer registers are stored in the buyer information DB 411. In addition, when the authentication key is issued using the target advertisement according to the present invention, authentication key information corresponding to the advertisement may be stored and managed in the buyer information DB 411 for free inquiry and verification.

To broker transactions for goods registered by the seller, the transaction broker 430 may provide the information on goods stored in the seller information DB 412 to the buyer terminal 230, search for goods corresponding to a key word such as a name of goods or details from the buyer terminal 230, and provide a list of the searched goods to the buyer terminal 230. When a payment for goods selected by the buyer is requested, the transaction broker 430 may provide payment screen information for the goods selected by the buyer to the buyer terminal 230 and perform the payment through an authentication process.

In particular, the target advertisement manager 440 may provide the target advertisement registered by the advertiser, i.e., an advertisement including information on providing a sample (a target advertisement with sample provision) on the web page. The authentication key generator 450 may generate an authentication key for enabling the customer terminal 230 selecting the target advertisement and requesting the sample of the advertised goods to receive the sample at an offline store, such as a franchise. The authentication key may include Arabic numerals, a discernible text, or barcode information provided by a random number generator, and may be transmitted to the customer terminal 230 by the message sender 480 so that the authentication key can be submitted directly using the terminal such as a cellular phone or in printed form such as a paper at the franchise. Alternatively, the authentication key may be stored and managed in the buyer information DB 411 or the seller information DB 412, and when a membership card issued previously by the online market operator is submitted at the franchise, comparison with the authentication key of the customer may be performed for sample provision authentication or approval.

When the target advertisement is being provided on the web page of the customer terminal 230, the target advertisement manager 440 may transmit franchise information in a sample application form as shown in FIG. 5 provided on the web page of the customer terminal 230 to the customer terminal 230, which has selected the target advertisement and requested the sample. When a notification that the sample application form as shown in FIG. 5 has been completed indicating a selected franchise, e.g., a Gangnam station franchise where the customer desires to receive the sample of advertised goods is received from the customer terminal 230, the authentication key generator 450 may generate an authentication key. The sample application form may be produced and registered in the seller information DB 412 by the seller (advertiser), or stored and managed in another database of the server 220 by an operator. Although the franchise has been selected and notified as shown in FIG. 5, the present invention is not limited thereto and the customer may receive the sample from any franchise in the list, with the franchise selection field removed from the form as shown in FIG. 5.

In this case, the authentication key generator 450 may request the customer terminal 230 selecting the target advertisement and requesting the sample to log in, and compare membership information based on log-in information from the customer terminal 230 with the target information profile managed in the database to determine whether the customer is the target customer, such that the sample can be provided only to the target customer, for example, specified by sex, age, or region. Accordingly, when the customer is the target customer specified by the advertiser, the target advertisement manager 440 may provide the sample application form to the customer terminal 230 so that the customer fills the form out. A determination as to whether the logged-in customer satisfies the sex, age, or region requirement defined in the target information profile may be made based on the membership information, i.e., sex, residence registration number, address, etc. registered in the database by the buyer upon subscribing. Here, the region may be determined based on an Internet protocol (IP) address that has been assigned to the customer terminal 230 for Internet use.

Meanwhile, when a request for verification of the generated authentication key is received from the franchise terminal 250, the sample receipt authenticator 460 may notify the franchise terminal 250 of whether the authentication is successfully performed. When the authentication key issued to the customer is submitted to the franchise, it can be input using the franchise terminal 250, such as a computer terminal capable of using the Internet, or a VAN, an open market seller management system, a POS, an ARS or a barcode reader connected to the Internet or stand-alone. When the customer submits the membership card, membership information (e.g., log-in information, or online market membership information) may be read and transmitted to the online market server 220 using the franchise terminal 250. Accordingly, the sample receipt authenticator 460 in the online market server 220 may compare the input authentication key or membership information with the authentication key managed in the database buyer information DB or the seller information DB for authentication or approval.

When the sample receipt authenticator 460 notifies of successful authentication and then the franchise provides the sample to the customer visiting the franchise and inputs details of sample provision to the customer to the franchise terminal 250, the franchise terminal 250 may transmit a notification that sample provision has been completed including the details. Upon receipt of the notification from the franchise terminal 250, the advertising expenditure settling unit 470 may settle advertising expenditure according to a commission policy. The commission may be determined based on an issue number of the authentication key generated by the online market or verified in response to a request for verification from the franchise or based on the number of samples provided by the franchise.

The seller or the franchise may receive an authentication-key issue list screen as shown in FIG. 6 via the target advertisement manager 440 by accessing the server 220 using its terminal and requesting the screen according to a predetermined process. The franchise may request verification of the authentication key by inputting the authentication key on the authentication key issue list screen as shown in FIG. 6. When the sample receipt authenticator 460 notifies of the successful authentication, a predetermined verification flag, such as a marking, may be displayed in a section "authentication key verification." When the verification flag is displayed in the section "authentication key verification," the franchise may provide the sample to the customer. The seller or the advertiser may confirm issue of the authentication key or provision of the sample on the authentication key issue list screen as shown in FIG. 6, as well.

Figure 7:
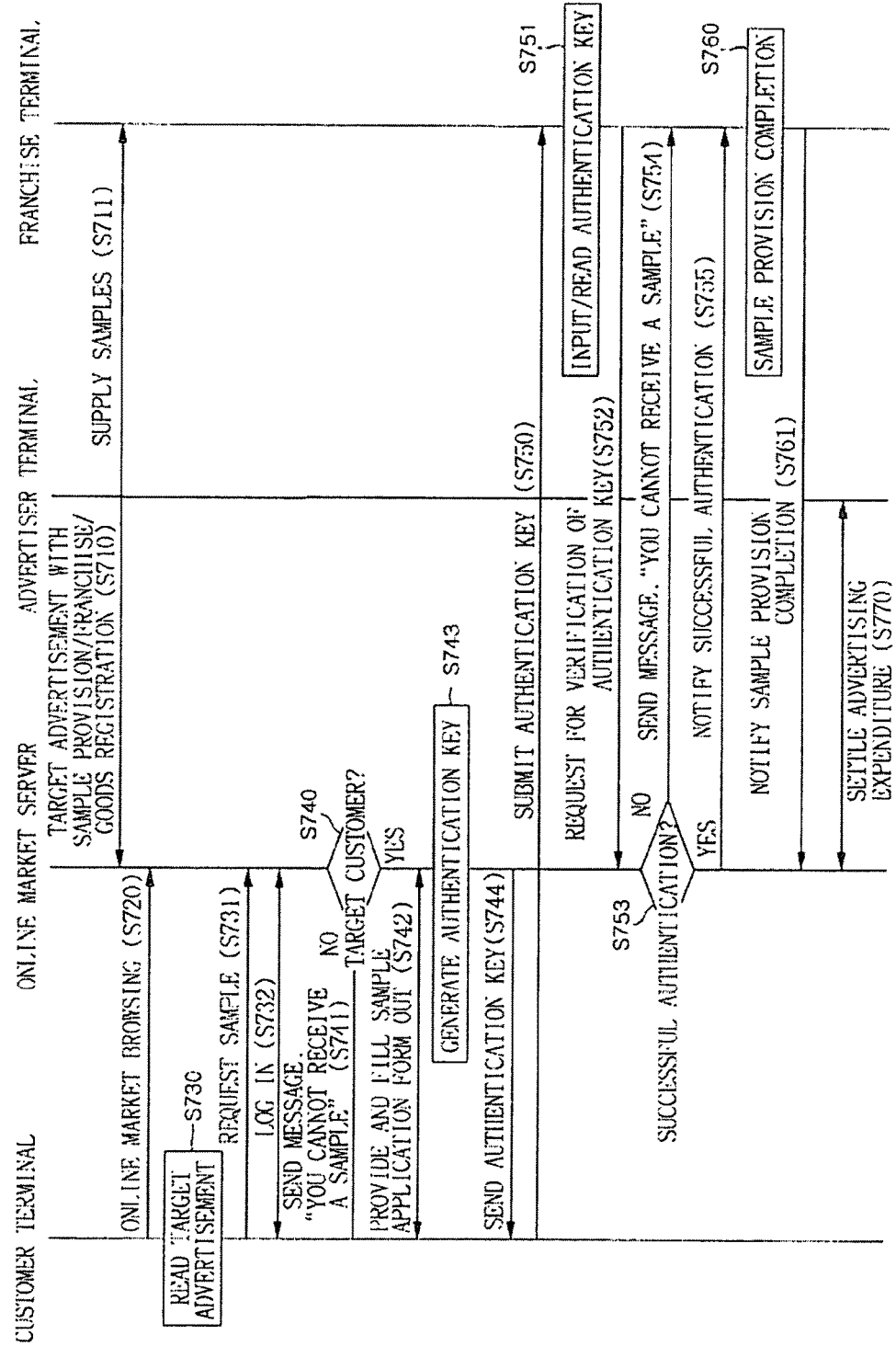
FIG. 7 is a flowchart illustrating an Internet advertisement method according to an exemplary embodiment of the present invention.

The Internet advertisement method according to an exemplary embodiment of the present invention will now be described in greater detail with respect to the flowchart of FIG. 7.

First, a seller or a advertiser may access the online market server 220 using the seller terminal (i.e., advertiser terminal) 240 to register, in the seller information DB 412, prices of goods, brands of goods, features of goods, as well as content of the target advertisement (e.g., images, videos, and the like), a target information profile (e.g., sex, age, and terminal access region of customers designated as objects to which a sample is to be provided), franchise information (list), and the like in order to use the target advertisement service (S710). Further, the seller or the advertiser supplies samples to be provided to customers (buyers) (e.g., scaled-down samples of large goods or some samples of objects sold by weight, like agricultural products) to franchises (S711).

The buyer or the customer browses goods of sellers sold on the online market server 220 using the buyer terminal 230 (S720). The buyer encounters many advertisements in order to compare goods of interest in terms of price, merits, and the like. In particular, the buyer may encounter the advertiser-registered target advertisement, i.e., an advertisement including sample provision-related information (a target advertisement with sample provision) on the web page (S730).

Figure 8:
FIG. 8 illustrates an example of a web page including a target advertisement with sample provision according to an exemplary embodiment of the present invention.

The target advertisement provided on the web page may include information indicating that the sample can be provided, e.g., "Try a sample," as in a leftmost advertisement of FIG. 8, and the customer may click on the advertisement to request the sample (S731). Upon receipt of the sample request from the customer, the authentication key generator 450 may request the customer terminal 230 selecting the target advertisement and requesting the sample to log in, in order to provide the sample only to a target customer, for example, specified by sex, age, or region (S732). The authentication key generator 450 may compare membership information based on log-in information received from the customer terminal 230 with the target information profile managed in the database to determine whether the customer is the target customer (S740). If the customer is not the target customer specified by the advertiser, the target advertisement manager 440 may send a message, "You cannot receive a sample" to the customer terminal 230. When the advertiser is the specific target customer, the target advertisement manager 440 provides the sample application form as shown in FIG. 5 to the customer terminal 230 so that the customer can fill the form out (S742). Accordingly, the customer may fill the sample application form out by selecting or inputting fields in the form of FIG. 5 using the customer terminal 230, and particularly, by selecting a franchise, e.g., a Gangnam station franchise where the customer desires to receive a sample of advertised goods, and transmit a notification that the sample application form has been completed by clicking on a tag "Do you want to receive a sample?". Although the customer terminal 230 has selected the franchise and notified the selected franchise, the present invention is not limited thereto and the customer may receive the sample from any franchise in the list, with the franchise selection field removed from the form as shown in FIG. 5.

Accordingly, the authentication key generator 450 may generate an authentication key for enabling the customer terminal 230 selecting the target advertisement and requesting the sample of the advertised goods to receive the sample at an offline store, such as a franchise (S743). The authentication key may include Arabic numerals, a discernible text, or barcode information provided by a random number generator, and may be transmitted to the customer terminal 230 by the message sender 480 in the form of response information to be displayed on the web page or in the form of a text message, such as an E-mail, or a short message service (SMS) message, a long message service (LMS) message, or a multimedia message service (MMS) message, so that the authentication key can be submitted directly using the terminal such as a cellular phone or in printed form such as a paper at the franchise (S744). Alternatively, the authentication key may be stored and managed in the buyer information DB 411 or the seller information DB 412, and when a membership card issued previously by the online market operator is submitted at the franchise, sample provision authentication or approval may be performed by comparison with the authentication key of the customer.

Meanwhile, after receiving the issued authentication key, the customer may submit the authentication key or a membership card at the franchise in order to receive the sample (S750). Accordingly, the authentication key or membership information may be input or read using the franchise terminal 250 (S751), and a request for verification of the authentication key may be made (S752). When the authentication key is submitted by the customer at the franchise, it can be input using the franchise terminal 250, such as a computer terminal capable of using the Internet, or a VAN, an open market seller management system, a POS, an ARS or a barcode reader connected to the Internet or stand-alone. When the customer submits the membership card, membership information (e.g., log-in information, or online market membership information) may be read and transmitted to the online market server 220 using the franchise terminal 250.

When a request for confirmation of the authentication key is received from the franchise terminal 250, the sample receipt authenticator 460 may compare the input authentication key or membership information with the authentication key managed in the database (i.e., the buyer information DB or the seller information DB) for authentication or approval (S753). For example, when the authentication is not successfully performed, a message, "You cannot receive a sample" (S754) may be sent to the franchise terminal 250. When the authentication is successfully made, a message, "authentication success" or any other approval information may be sent to the franchise terminal 250 (S755).

When the sample receipt authenticator 460 notifies of successful authentication as described above, the franchise provides the sample to the customer (S760). When a franchise clerk inputs details of the sample provision to the customer visiting the franchise, e.g., sample provision information as shown in FIG. 6 to the franchise terminal 250, the franchise terminal 250 may transmit a sample provision completion notification including the details to the server 220 (S761). Upon receipt of the sample provision completion notification from the franchise terminal 250, the advertising expenditure settling unit 470 may settle advertising expenditure according to a commission policy and notify the advertiser terminal 240 of the details (S770). The commission may be determined based on an issue number of the authentication key generated by the online market or verified in response to a request for verification from the franchise or based on the number of samples provided by the franchise.

The functions of the method and system of the present invention can be implemented as computer-readable code in a computer-readable recording medium. The computer-readable recording medium is any recording medium for storing data that can be read by a computer system. Examples of the computer-readable recording medium include a read-only memory (ROM), a random access memory (RAM), a compact disk-read only memory (CD-ROM), a magnetic tape, a floppy disk, and optical data storage. Alternatively, the medium may be implemented in the form of carrier waves (e.g., Internet transmission). The computer-readable recording medium may be distributed among networked computer systems, and the computer-readable code may be stored and executed in a decentralized manner.

With an Internet advertisement method and system according to the present invention, an advertisement in the form of a banner on a web page of an online market, such as an Internet shopping mall, for enabling selected target customers to receive a commercial sample at a membership-based offline store can be performed, such that a targeting goods advertisement can be effectively performed, membership-based offline stores can be publicized, and increasing visits from customers can lead to an increase in sales.

With the Internet advertisement method and system according to the present invention, a target customer can easily receive a commercial sample using an authentication key or membership card issued through an advertisement on a web page at a desired membership-based offline store without requesting an advertiser to directly deliver the sample, thereby conveniently satisfying needs of customers desiring to purchase goods after receiving the commercial sample.

It will be apparent to those skilled in the art that various modifications can be made to the above-described exemplary embodiments of the present invention without departing from the spirit or scope of the invention. Thus, it is intended that the present invention cover all such modifications provided they come within the scope of the appended claims and their equivalents.

I claim:

1. A method comprising:
   receiving, from an advertiser terminal of an advertiser by a server, a target information profile of a product, the server comprising a machine having a memory and at least one processor, the target information profile comprising at least one characteristic of target users;
   registering the target information profile received from the advertiser terminal in a database of the server;
   presenting an advertisement of the product on a webpage to a customer terminal of a user, the advertisement including an option to request a sample of the product associated with the presented advertisement of the product on the webpage;
   in response to receiving a selection of the option to request the sample, prompting the user to log-in to the server via the customer terminal;
   determining whether the user qualifies as one of the target users based on a comparison of log-in information of the user received via the customer terminal with the target information profile received from the advertiser terminal;
   in response to determining that the user qualifies as one of the target users, generating by a random number generator of the server, an authentication key for enabling provision of the sample, the authentication key comprising one or more of numerals, text, or barcode information generated by the random number generator;
   transmitting the authentication key for display on the customer terminal;
   storing the authentication key at a database of the server;
   receiving a request to verify the authentication key from a franchise terminal machine of an offline store;
   performing a verification of the authentication key by comparing the authentication key with stored verification keys in the database of the server for a match in response to the receiving of the request to verify; and
   sending a notification of a successful verification to the franchise terminal machine in response to the authentication key being successfully verified, the notification approving the offline store to provide the sample to the user.

2. The method of claim 1, wherein:
   determining whether the customer is a target customer includes comparing the target information profile with membership information based on the log-in information to make the determination.

3. The method of claim 1, wherein the target information profile comprises at least one selected from the group consisting of:
   sex, age, and terminal access region of customers designated as objects to which the sample is to be provided.

4. The method of claim 1, further comprising:
   registering information on at least one offline store in the database; and
   providing the offline store information in a sample application form to the customer terminal, the at least one offline store being selectable as a desired location to receive the sample of the advertised products when the sample application form is being filled out using the customer terminal.

5. The method of claim 4, further comprising:
receiving, from the customer terminal, a selection of an offline store from the sample application form, wherein the generating and transmitting of the authentication key is in response to the receiving of the selection of the offline store from the sample application form.

6. The method of claim 1, further comprising receiving the request to verify the authentication key via at least one medium selected from the group consisting of:
a virtual area network, an open market seller management system, a point of sale, an automatic replying system, a cellular phone, and a barcode reader.

7. The method of claim 1, further comprising:
after sending the notification of the successful verification to the franchise terminal machine, receiving a notification that provision of the sample has been completed that includes details of sample provision to the customer visiting the offline store.

8. The method of claim 7, further comprising:
after receiving the notification of the sample provision completion, automatically settling, by the server, advertising expenditure according to a commission policy.

9. The method of claim 8, wherein the commission policy is determined based on an issue number of the authentication key generated by the server or verified in response to a request for verification from the franchise terminal machine or based on the number of samples provided by the offline store.

10. A system comprising:
a server having at least one processor, the server being configured to:
receive, from an advertiser terminal of an advertiser, a target information profile of a product, the target information profile comprising at least one characteristic of target users;
register the target information profile received from the advertiser terminal in a database of the server;
present an advertisement of the product on a webpage to a customer terminal of a user, the advertisement including an option to request a sample of the product associated with the presented advertisement of the product on the webpage;
in response to receiving a selection of the option to request the sample, prompting the user to log-in to the server via the customer terminal;
determine whether the user qualifies as one of the target users based on a comparison of log-in information of the user received via the customer terminal with the target information profile received from the advertiser terminal;
in response to determining that the user qualifies as one of the target users, generate an authentication key for enabling provision of the sample, the authentication key comprising one or more of numerals, text, or barcode information generated by a random number generator;
transmit the authentication key for display on the customer terminal;
storing the authentication key at a database of the server;
receive a request to verify the authentication key from a franchise terminal machine of an offline store;
perform a verification of the authentication key by comparing the authentication key with stored verification keys in the database of the server for a match in response to the receiving of the request to verify; and
send a notification of a successful verification to the franchise terminal machine in response to the authentication key being successfully verified, the notification approving the offline store to provide the sample to the user.

11. The system of claim 10, wherein the server is configured to: determine whether the customer is a target customer by comparing the target information profile with membership information based on the log-in information to make the determination.

12. The system of claim 10, wherein the target information profile comprises at least one selected from the group consisting of:
sex, age, and terminal access region of customers designated as objects to which the sample is to be provided.

13. The system of claim 10, further comprising:
registering information on at least one offline store in the database; and
providing the offline store information in a sample application form to the customer terminal, the at least one offline store being selectable as a desired location to receive the sample of the advertised products when the sample application form is being filled out using the customer terminal.

14. The system of claim 10, wherein the server is further configured to:
receive, from the customer terminal, a selection of an offline store from the sample application form, wherein the generating and transmitting of the authentication key is in response to the receiving of the selection of the offline store from the sample application form.

15. The system of claim 10, wherein the server is further configured to receive the request to verify the authentication key via at least one medium selected from the group consisting of:
a virtual area network, an open market seller management system, a point of sale, an automatic replying system, a cellular phone, and a barcode reader.

16. The system of claim 10, wherein the server is further configured to:
after sending the notification of the successful verification to the franchise terminal machine that includes, receive a notification that provision of the sample has been completed that includes details of sample provision to the customer visiting the offline store.

17. The system of claim 16, wherein the server is further configured to:
after receiving the notification of the sample provision completion, automatically settle, by the server, advertising expenditure according to a commission policy.

18. The system of claim 17, wherein the commission policy is determined based on an issue number of the authentication key generated by the server or verified in response to a request for verification from the franchise terminal machine or based on the number of samples provided by the offline store.

19. A non-transitory machine-readable storage medium storing a set of instructions that, when executed by at least one processor, causes the at least one processor to perform operations comprising:
receiving, from an advertiser terminal of an advertiser by a server, a target information profile of a product, the target information profile comprising at least one characteristic of target users;

registering the target information profile received from the advertiser terminal in a database of the server;

presenting an advertisement of the product on a webpage to a customer terminal of a user, the advertisement including an option to request a sample of the product associated with a selected advertisement of the product on the webpage;

in response to receiving a selection of the option to request the sample, prompting the user to log-in to the server via the customer terminal;

determining whether the user qualifies as one of the target users customers based on a comparison of log-in information of the user received via the customer terminal with the target information profile received from the advertiser terminal;

in response to determining that the user qualifies as one of the target users, generating an authentication key for enabling provision of the sample, the authentication key comprising one or more of numerals, text, or barcode information generated by a random number generator;

transmitting the authentication key for display on the customer terminal;

storing the authentication key at a database of the server;

receiving a request to verify the authentication key from a franchise terminal machine of an offline store;

performing a verification of the authentication key by comparing the authentication key with stored verification keys in the database of the server for a match in response to receiving the request to verify; and sending a notification of a successful verification to the franchise terminal machine in response to the authentication key being successfully verified, the notification approving the offline store to provide the sample to the user.

\* \* \* \* \*